United States Patent
Kadowaki

[19]

[11] Patent Number: 6,154,426
[45] Date of Patent: Nov. 28, 2000

[54] OPTICAL PICK-UP HEAD UNIT AND INFORMATION RECORD AND PLAYBACK EQUIPMENT USING THE OPTICAL PICK-UP HEAD UNIT

[75] Inventor: Shin-ichi Kadowaki, Hyogo, Japan

[73] Assignee: Matsushita Electric Industrial Co., Ltd., Osaka, Japan

[21] Appl. No.: 09/454,751

[22] Filed: Dec. 6, 1999

[30] Foreign Application Priority Data

Dec. 8, 1998 [JP] Japan .................................. 10-348364

[51] Int. Cl.[7] ...................................................... G11B 7/00
[52] U.S. Cl. .................................. 369/44.41; 369/124.01; 369/124.12
[58] Field of Search ............................. 369/44.41, 44.42, 369/44.01, 44.12, 44.25, 44.27, 44.28, 44.34, 47, 120, 124.01, 124.1, 124.12

[56] References Cited

U.S. PATENT DOCUMENTS

| | | |
|---|---|---|
| 4,369,367 | 1/1983 | Horikawa . |
| 4,377,217 | 3/1983 | Nishikawa et al. . |
| 4,975,566 | 12/1990 | Uda . |
| 5,650,987 | 7/1997 | Kadowaki .......................... 369/44.41 X |
| 5,729,512 | 3/1998 | Alon .................................. 369/44.41 X |
| 5,892,741 | 4/1999 | Kadowaki et al. .............. 369/44.41 X |

*Primary Examiner*—Muhammad Edun
*Attorney, Agent, or Firm*—Merchant & Gould P.C.

[57] ABSTRACT

The present invention provides an optical pick-up head unit comprising a light source to radiate a beam, a focusing optical system to converge the beam on an optical recording medium, and a photodetector to output an electric signal corresponding to the quantity of received light. The photodetector includes a plurality of receiving parts and a plurality of I-V converting parts that receive respectively current signals outputted from the receiving parts and convert the current signals into voltage signals. First I-V receiving parts output signals that change in the positive direction when light enters the receiving parts while second I-V converting parts output signals that change in the negative direction when light enters the receiving parts. The receiving parts are respectively connected to any one of the first I-V converting parts or the second I-V converting parts. As a result, the optical pick-up head unit is less influenced by extraneous noise even at a high-speed reproduction, and it can reproduce information recorded on a medium with high reliability. The present invention also provides information record and playback equipment using the optical pick-up head unit.

10 Claims, 18 Drawing Sheets

OPTICAL PICK-UP HEAD UNIT AND INFORMATION RECORD AND PLAYBACK EQUIPMENT USING THE OPTICAL PICK-UP HEAD UNIT

FIELD OF THE INVENTION

This invention relates to an optical pick-up head unit that can accurately record, reproduce or erase information to be recorded on optical recording media such as compact disks (CDs) and digital versatile disks (DVDs), and information record and playback equipment using the same.

BACKGROUND OF THE INVENTION

A tendency for information multi-media has developed and the amount of information has increased rapidly. Optical recording media such as CDs have been often used for the media to record such high-volume data. However, the reliability of the information reproduction is not certain from many points of view. Various efforts are taken to improve accuracy and reliability in reading the information.

FIG. 17 shows a structure of a conventional optical pick-up head unit using a CD as an optical recording medium. In FIG. 17, 1 denotes a light source, 7 denotes a divergent beam, 23 denotes an object lens, 41 denotes an optical recording medium, 51 denotes a photodetector, 60 denotes a diffraction grating, 61 denotes a half mirror, and 91 and 92 denote actuators respectively.

In FIG. 17, the light source 1 is a semiconductor laser that radiates beams 780 nm in wavelength. The divergent beam 7 radiated from the light source 1 enters the diffraction grating 60 and becomes three beams 7A, 7B, and 7C. The beam 7A is a zero-order diffracted light while 7B and 7C denote ±first-order diffracted light. For simplifying, those three beams (7A, 7B, 7C) are shown by only one beam in FIG. 17.

The three beams (7A, 7B, 7C) generated at the diffraction grating 60 enter the half mirror 61, and half of the light quantity is reflected to head for the object lens 23. The object lens 23 is a finite system object lens to focus the beams (7A, 7B, 7C) on the optical recording medium 41. The numerical aperture of the object lens 23 is 0.08 at the light source 1 side and 0.45 at the optical recording medium 41 side.

A series of pits about 0.83–3 µm in length (corresponding to 3T–11T that are 8–16 modulated (EFM)) is recorded on an information recording surface 41A located on the optical recording medium 41, at a track pitch of 1.6 µm. Here, T indicates a channel bit cycle. The substrate 41B of the optical recording medium 41 has a thickness of 1.2 mm.

The beams (7A, 7B, 7C) reflected and diffracted at the optical recording medium 41 re-transmit through the object lens 23 before entering the half mirror 61. Half of the quantity of the light beams (7A, 7B, 7C) entering the half mirror 61 transmits through the half mirror 61 to be applied with astigmatism, and are received at the photodetector 51.

Subsequently, a focus error (FE) signal, a tracking error (TE) signal, and a radio frequency (RF) signal that reproduces information recorded on the optical recording medium 41 are generated by using signals outputted from the photodetector 51. The FE signal is detected by astigmatic method, while the TE signal is detected by a three-beam method. The FE signal and the TE signal are supplied to the actuators 91 and 92 for controlling both focus and tracking.

FIG. 18 is a schematic view to show the structure of the photodetector 51. The photodetector 51 is composed of a silicon substrate and includes six receiving parts (511–516) and six I-V converting parts (511A–516A). The beam 7A is received at the receiving parts 511–514, while the beam 7B is received at the receiving part 515 and 7C at the receiving part 516 respectively. The receiving parts 511–516 output current signals corresponding to the quantity of the received light. The I-V converting parts 511A–516A receive the current signals outputted from the receiving parts 511–516, and convert the signals respectively into low-impedance voltage signals. Since signals outputted from the photodetector 51 are converted into voltage signals at the I-V converting parts, they are less influenced by extraneous electric noise.

Musical signals recorded on a CD can be reproduced by rotating the optical recording medium at a linear velocity of 1.2 m/s, and the repeating frequency including marks and spaces in 3T is 720 kHz. The electric circuit requires a band up to about 1.4 MHz at a frequency of −3 dB. The velocity is defined as a single speed. Recently however, CD-ROMs as recording media for recording computer data have become popular to be used as peripheral devices, and information reproducing apparatuses for reproducing data at a high speed of from 30× to 40× have been developed actively for transferring data as quick as possible. Since the signal band is widened at a higher speed, the signals are more subjected to influences of extraneous noise. Due to the influences of the extraneous noise, data recorded on a medium cannot be reproduced with high reliability even when voltage signals are outputted from the photodetector 51. Especially a CD-RW as a rewritable medium is subjected to influences of the extraneous noise because the medium has a low reflectivity.

SUMMARY OF THE INVENTION

To solve the above-identified problems, the present invention provides an optical pick-up head unit that is less influenced by extraneous noise even during a high-speed reproduction and that can reproduce information recorded on a medium with high reliability. The present invention also provides information record and playback equipment using the optical pick-up head unit.

In order to achieve the above purposes, an optical pick-up head unit according to the present invention includes a light source to radiate a beam, a focusing optical system that receives the beam radiated from the light source and converges the beam at a microspot on an optical recording medium, and a photodetector that receives the beam irradiated on the optical recording medium and outputs electric signals corresponding to the quantity of the received light. The photodetector includes a plurality of receiving parts that output signals used to generate focus error signals, and a plurality of I-V converting parts that receive respective current signals outputted from the receiving parts and convert the current signals into voltage signals. First I-V converting parts output signals that change in the positive direction when light enters the receiving parts, while second I-V converting parts output signals that change in the negative direction when light enters the receiving parts. Substantially half of the receiving parts are connected to the first I-V converting parts and the remaining are connected to the second I-V converting parts.

Accordingly, jitter deterioration caused by extraneous noise is decreased even when the amplitude of the RF signal is low or reproduction is carried out at a high speed, and information recorded on an optical recording medium can be reproduced with high reliability. Moreover, by inverting the polarity of some signals outputted from the receiving parts and outputting the signals from the photodetectors, an RF signal can be generated by a differentiation operation without increasing signal lines. Therefore, the present invention is expected to be especially suitable for use in a small and thin optical pick-up head unit where the number of output terminals will affect the unit's size.

In an optical pick-up head in one embodiment of the present invention, a plurality of receiving parts preferably output signals used to generate tracking error signals. It is more preferable that an optical pick-up head unit has a plurality of receiving parts to output signals used to generate tracking error signals, as well as the receiving parts used to output signals for generating the focus error signals, since similar effects are obtainable by the signals used to generate the tracking error signals.

An optical pick-up head unit in an embodiment of the present invention includes a light source to radiate a beam, a focusing optical system that receives the beam radiated from the light source and converges the beam at a microspot on an optical recording medium, and a photodetector that receives the beam irradiated on an optical recording medium and outputs electric signals corresponding to the quantity of the received light. The photodetector includes receiving parts that output signals used to generate focus error signals, I-V converting parts that receive current signals outputted from the receiving parts and convert the current signals into voltage signals, and a signal generating part. The signal generating part generates first signals that change in the positive direction and second signals that change in the negative direction when light enters the receiving parts. The numbers of the first and second signals are substantially equal.

Accordingly, jitter deterioration caused by extraneous noise is decreased even when the amplitude of the RF signal is low or reproduction is carried out at a high speed, and information recorded on the optical recording medium can be reproduced with high reliability. Moreover, by inverting the polarity of some signals outputted from the receiving parts and outputting the signals from the photodetectors, the RF signal can be generated by a differentiation operation without increasing signal lines. Therefore, the present invention is expected to be especially suitable for a use in small and thin optical pick-up head unit where the number of the output terminals will affect the unit's size.

In an optical pick-up head in one embodiment of the present invention, receiving parts preferably output signals used to generate tracking error signals. It is more preferable that an optical pick-up head in one embodiment of the present invention has receiving parts to output signals used for generating tracking error signals, as well as the above-mentioned receiving parts used to output signals for generating the focus error signals, since similar effects are obtainable by the signals used to generate the tracking error signals.

For achieving the above purposes, an optical pick-up head unit in one embodiment of the present invention includes a light source to radiate a beam, a focusing optical system that receives the beam radiated from the light source and converges the beam at a microspot on an optical recording medium, and a photodetector that receives the beam irradiated on the optical recording medium and outputs electric signals corresponding to the quantity of the received light. The photodetector includes receiving parts that output signals used to generate focus error signals, I-V converting parts that receive current signals outputted from the receiving parts and convert the current signals into voltage signals, and a signal generating part. The signal generating part generates first signals that change in the positive direction and second signals that change in the negative direction when light enters the receiving parts. The unit further includes a delay correcting part to correct relative delay time between the first signals and the second signals.

Accordingly, the signal lines for generating RF signal can be decreased to two, and this structure is difficult for noise to enter, so higher S/N ratio can be secured.

In an optical pick-up head unit of the present invention, preferably the first signals and the second signals are generated at the signal generating part by using the same semiconductor element, since information can be reproduced at a higher speed because of the decreased difference in the relative delay time.

Information record and playback equipment of the present invention to achieve the above-mentioned purposes includes an actuating part to change a relative position between an optical recording medium and an optical pick-up head unit, and an electric signal processing part that receives signals outputted from the optical pick-up head and carries out a signal operation to obtain desired information. The above-described optical pick-up head is used in the information record and playback equipment.

Accordingly, jitter deterioration caused by extraneous noise is decreased even when the amplitude of an RF signal is low or reproduction is carried out at a high speed, and information record and playback equipment of the present invention can reproduce information recorded on an optical recording medium with high accuracy.

Information record and playback equipment according to the present invention preferably includes a differentiation operating part to generate signals that can reproduce information recorded on an optical recording medium by receiving signals outputted from the optical pick-up head unit and carrying out a differentiation operation. Extraneous noise can be decreased by the differentiation operation.

DETAILED DESCRIPTION OF THE INVENTION

Optical pick-up head units according to the present invention are explained below with reference to FIGS. 1–16. For conventional optical pick-up head units, identical element numbers are used when similar elements can be applied.

Figure 1:
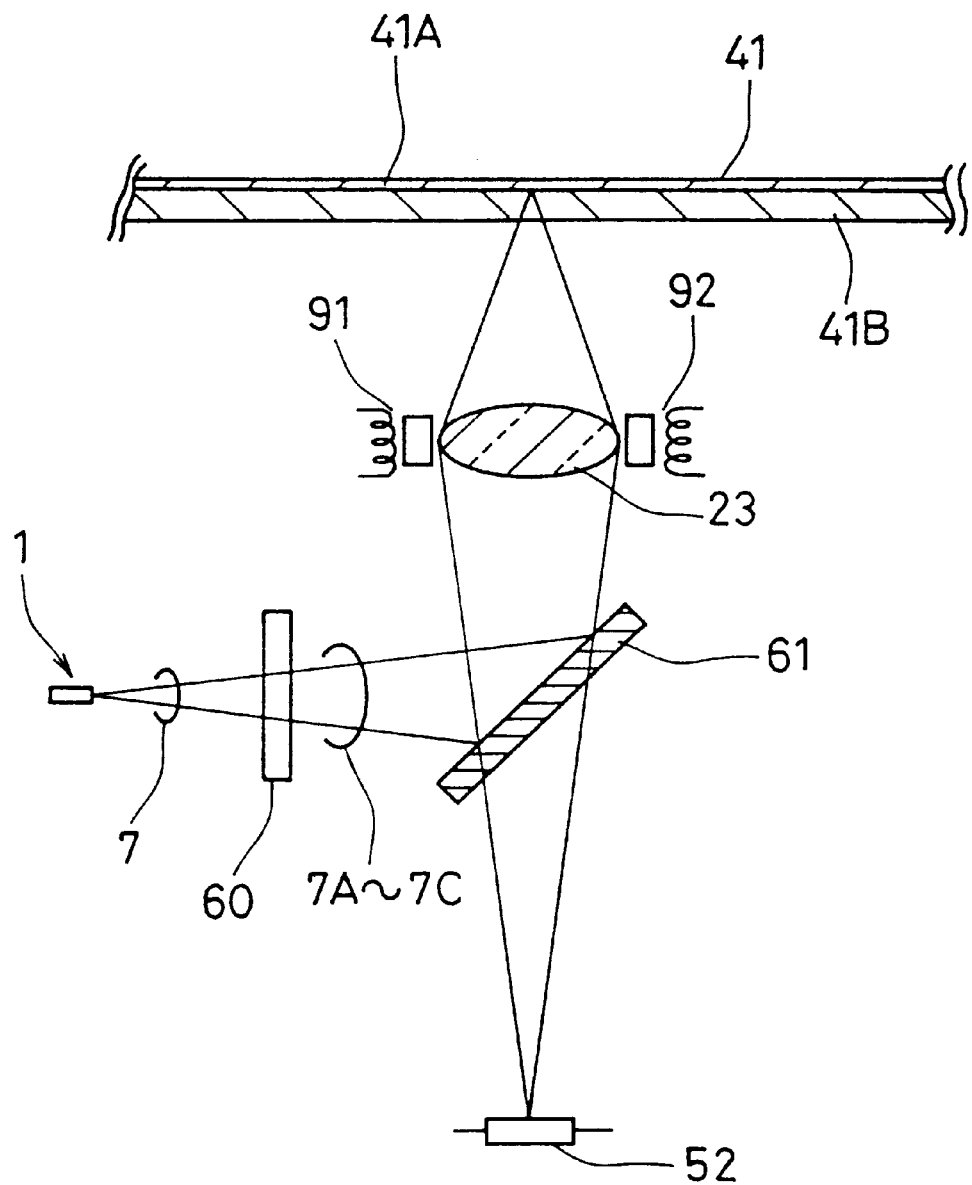
FIG. 1 is a schematic view to show a structure of an optical pick-up head unit in one embodiment of the present invention.

FIG. 1 is a schematic view to show the structure of an optical pick-up head unit. In FIG. 1, a light source 1 is a semiconductor laser that radiates a beam 780 nm in wavelength. A divergent beam 7 radiated from the light source 1 enters a diffraction grating 60 and becomes three beams 7A, 7B and 7C. The beam 7A denotes a zero-order diffracted light while 7B and 7C denote ±first-order diffracted light. For simplifying, those three beams (7A, 7B, 7C) are shown by only one beam in FIG. 1.

The three beams (7A, 7B, 7C) generated in the diffraction grating 60 enter the half mirror 61, and half of the light quantity is reflected to head for the object lens 23. The object lens 23 is a finite system lens that focuses the beams (7A, 7B, 7C) on the optical recording medium 41. The numerical aperture of the object lens 23 is 0.08 at the light source 1 side and 0.45 at the optical recording medium 41 side.

On the optical recording medium 41, a series of pits about 0.83–3 $\mu$m in length (corresponding to 3T–11T modulated 8–16 (EFM)) are recorded on an information recording surface 41A at a track pitch of 1.6 $\mu$m. Here, T indicates a channel bit cycle. The substrate 41B of the optical recording medium 41 has a thickness of 1.2 mm.

The beams (7A, 7B, 7C) reflected and diffracted at the optical recording medium 41 re-transmit through the object lens 23 before entering the half mirror 61. Half of the quantity of the light beams (7A, 7B, 7C) entering the half mirror 61 transmits through the half mirror 61 to be applied with astigmatism, and is received at the photodetector 52.

Subsequently, an FE signal, a TE signal, and an RF signal are generated by using signals outputted from the photodetector 52. The FE signal is detected by astigmatic method, while the TE signal is detected by a three-beam method. The FE signal and the TE signal are supplied to the actuators 91 and 92 for controlling both focusing and tracking.

Figure 2:
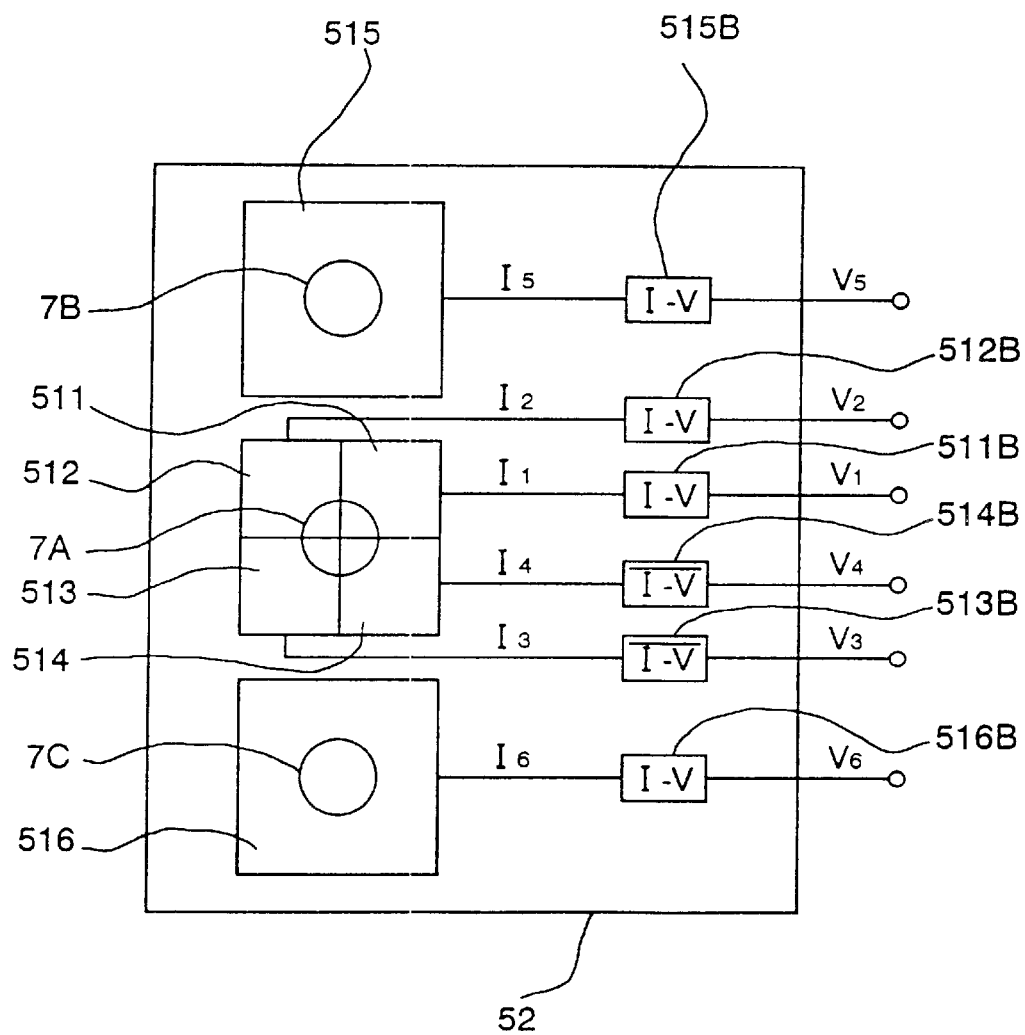
FIG. 2 is a schematic view to show a photodetector of the optical pick-up head unit.

FIG. 2 is a schematic view to show the structure of the photodetector 52. The photodetector 52 is composed of a p-type silicon substrate and includes six receiving parts (511–516) and six I-V converting parts (511B–516B). The beam 7A is received at the receiving parts 511–514, while the beam 7B is received at the receiving part 515 and 7C, at the receiving part 516 respectively. The receiving parts 511–516 output current signals I1–I6 corresponding to the quantity of the received light. The I-V converting parts 511B–516B receive the current signals I1–I6 outputted from the receiving parts 511–516, and convert the signals respectively into low-impedance voltage signals V1–V6.

Among the six I-V converting parts, 513B and 514B are non-inversion type current-voltage converters while the remaining four are inversion type current-voltage converters. When light enters the receiving parts, the inversion type converters output signals that change in the positive direction while the non-inversion type converters output signals that change in the negative direction.

Figure 3:
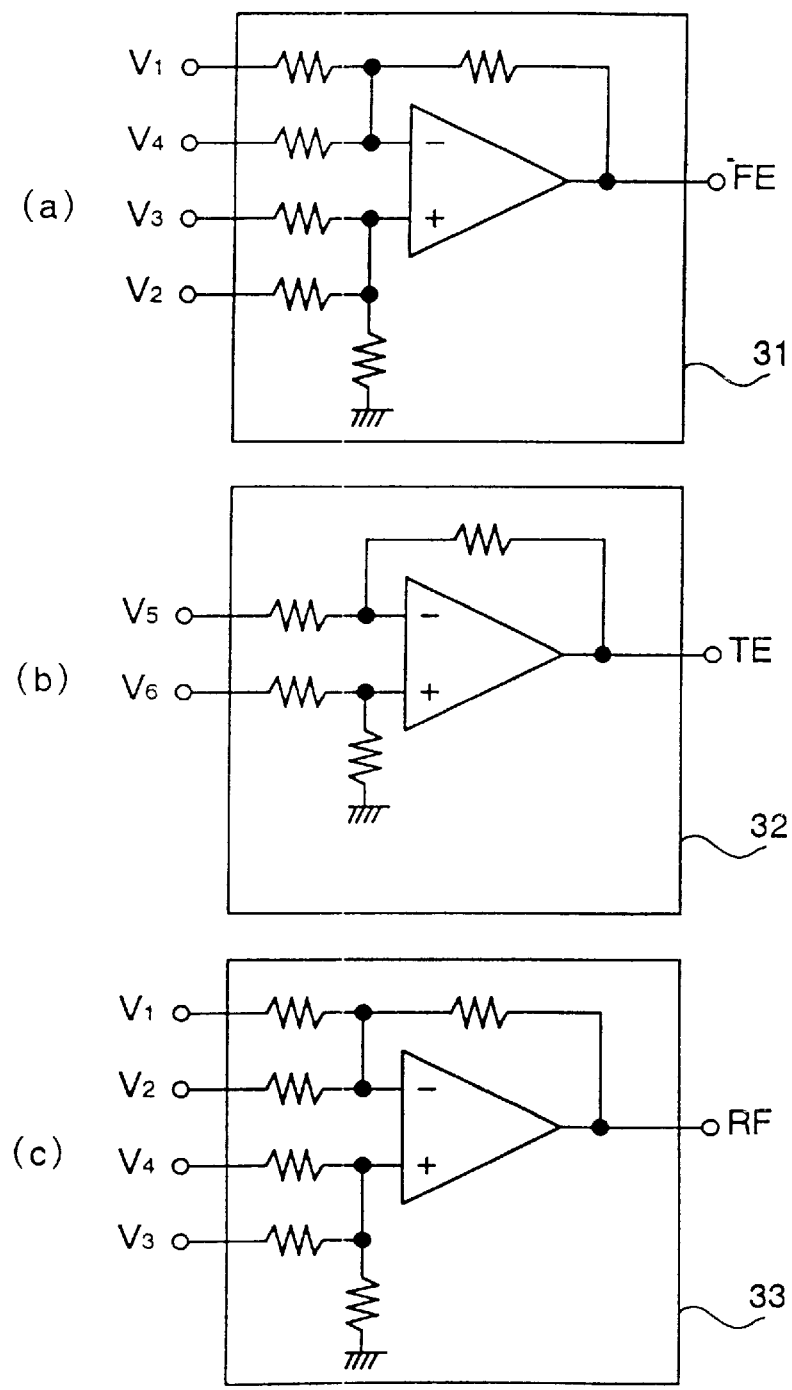
FIGS. 3(a)–(c) are schematic views to show operating parts in an optical pick-up head unit in one embodiment of the present invention.

In FIG. 3, (a) (b) and (c) denote operating parts to generate an FE signal, a TE signal and an RF signal, respectively. The operating parts 31, 32 and 33 are provided to an electric signal processing part 83 of information record and playback equipment as described later. The operating parts 31, 32 and 33 include differentiation operators, to which the signals V1–V6 outputted from the photodetector 52 are inputted respectively.

Since the I-V converting parts 513B and 514B are non-inversion type, an RF signal as well as an FE signal and a TE signal can be obtained by a differentiation operation. More specifically, the RF signal is obtainable by inputting signals V1 and V2 in inversion input terminals while inputting V3 and V4 in non-inversion inputting terminals respectively. In most cases, extraneous noise enters the wiring that leads from the photodetector 52 to the operation parts 31, 32, and 33. When a plurality of wirings are provided from the photodetector 52 to the operating parts, the entering noise becomes in-phase. Since this tendency becomes strong as the wirings are positioned closer, the wirings to introduce the signals V1–V6 from the photodetector 52 to the operating parts 31, 32, 33 are preferably positioned as close as possible. Furthermore, the wirings are preferably equalized in length to share the quantity of the entering noise, so that noise can be reduced.

In this embodiment, the RF signal is detected by a differentiation operation. Therefore, even if extraneous noise enters the wiring that leads from the photodetector 52 to the operating part 33, the noise can be removed by the differentiation operation. As a result, the extraneous noise will cause less jitter deterioration even when the RF signal amplitude is low or reproduction is carried out at a high speed, and thus, information recorded on the optical recording medium can be reproduced with high reliability. Moreover, the RF signal can be generated by a differentiation operation without further increasing signal lines, since the polarity of some of the signals V1–V6 outputted from the receiving parts is reversed when the signals are outputted from the photodetector.

Therefore, this embodiment is suitable for a small and thin optical pick-up head unit where the number of output terminals will affect the unit's size. Moreover, since all signals necessary for activating information record and playback equipment can be obtained by the differentiation operation, the apparatus is less influenced by extraneous noise and it is highly reliable. In this embodiment, the I-V converting parts are classified into two types composed of an inversion type and a non-inversion type. However, the structure is not limited as long as signals of substantially two kinds of polarities are outputted. For example, the I-V converting parts can be restricted to either inversion type or non-inversion type while the polarity of the receiving parts is classified into two. Alternatively, an inversion amplifier and a non-inversion amplifier can be provided at the rear side of the I-V converting parts.

Figure 4:
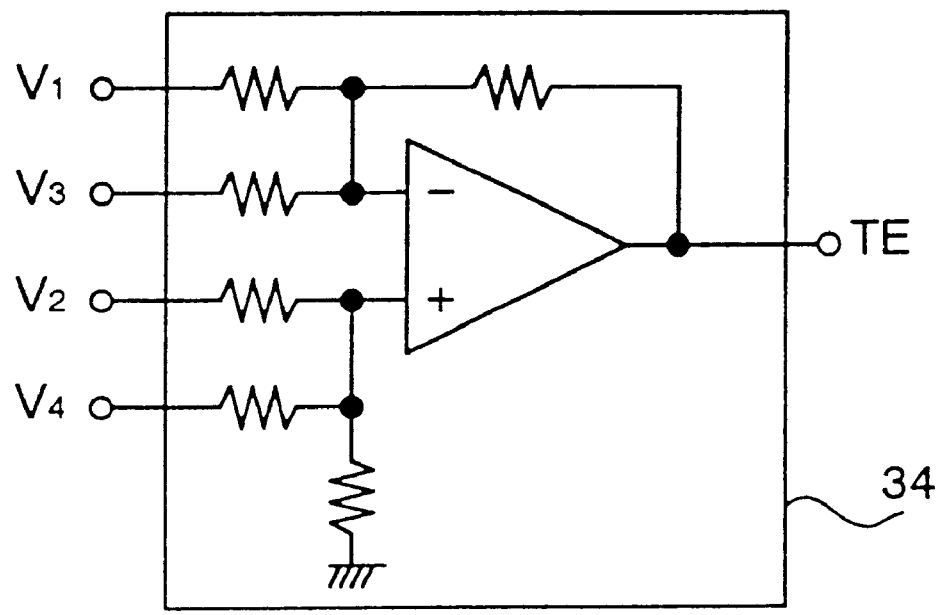
FIG. 4 is a schematic view to show an operating part of an optical pick-up head unit in another embodiment of the present invention.

FIG. 4 shows an operating part to detect a TE signal by using a push-pull method. Since the operating part 34 includes a differentiation operator similar to the operating parts 31, 32, 33, the operating part 34 is less influenced by extraneous noise.

Figure 5:
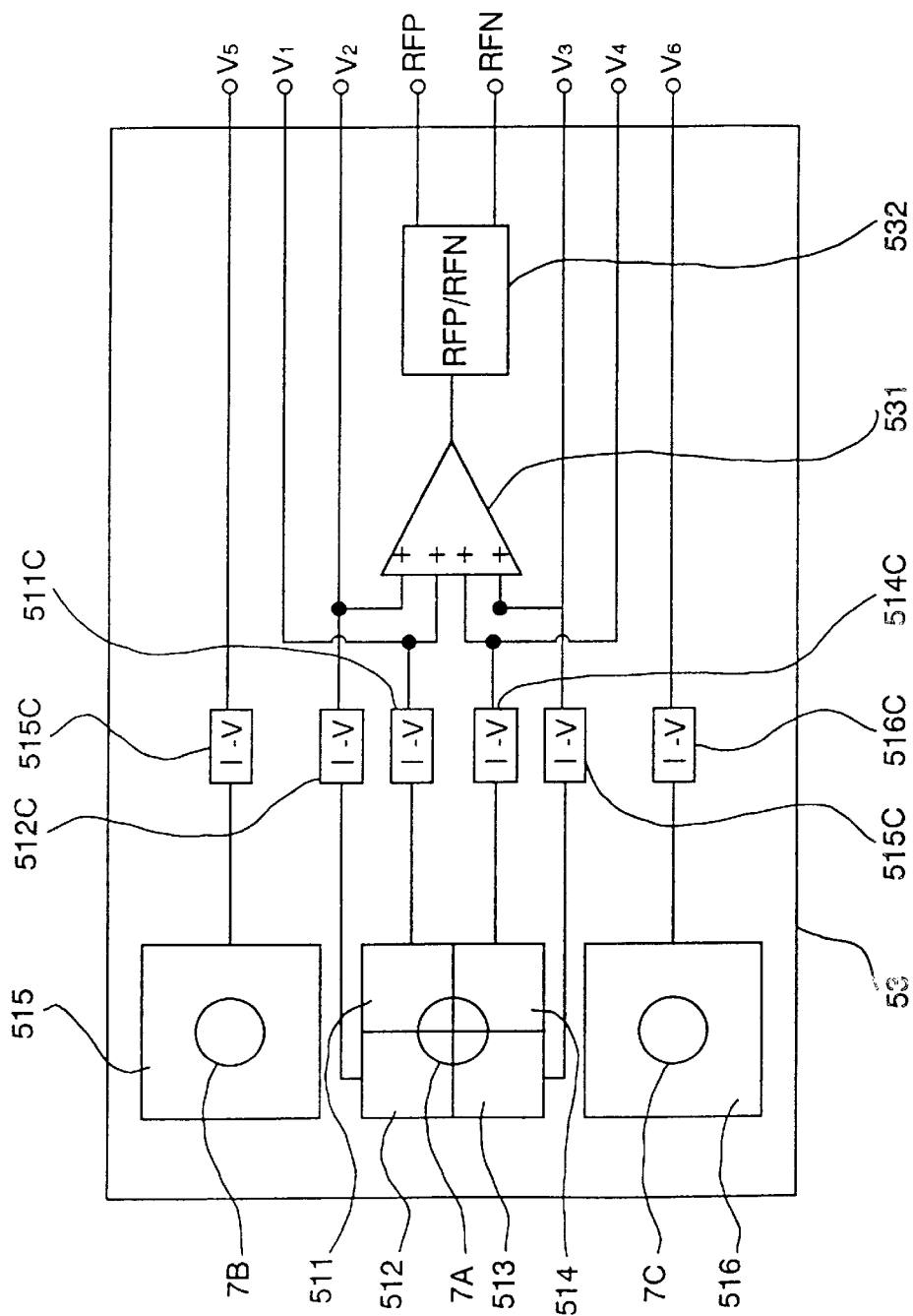
FIG. 5 is a schematic view to show the structure of a photodetector in another embodiment of the present invention.

FIG. 5 is a schematic view of a photodetector 53 in another embodiment In FIG. 5, the photodetector 53 is used in place of the photodetector 52 in order to compose an optical pick-up head unit.

The photodetector 53 includes I-V converting parts 511C–516C that receive signals outputted from six receiving parts 511–516 and convert the signals into voltage signals, an addition-operating part 531 that receives signals outputted from the I-V converting parts 511C–514C in order to carry out an addition-operation, and a differential signal generating part 532 that receives a signal outputted from the addition-operating part 531 and generates two kinds of differential signals.

The I-V converting parts 511C–516C are inversion type current-voltage converters. A signal outputted from the addition-operation part 531 is the RF signal generated at the photodetector. The differential signal generating part 532 outputs a signal RFP that changes in the same direction as the inputted signal, and also a signal RFN that changes in the reverse direction.

Figure 6:
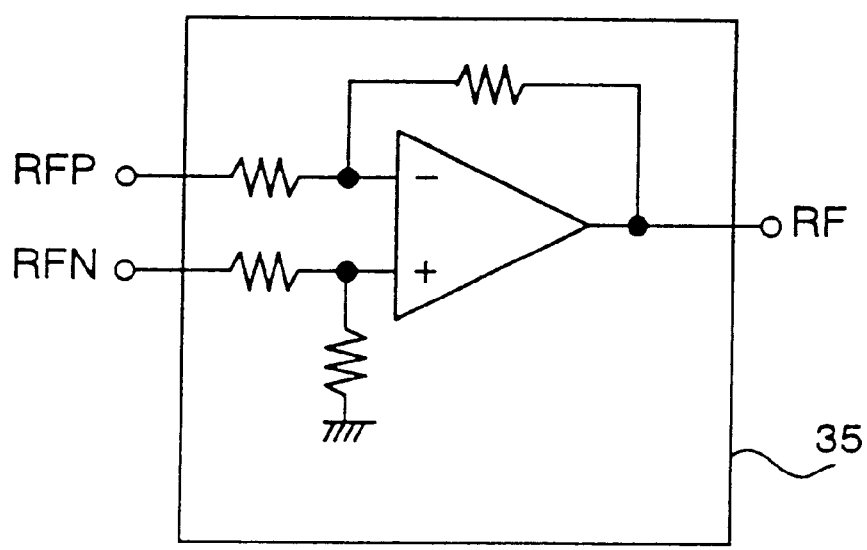
FIG. 6 is a schematic view to show the structure of an operating part in another embodiment of the present invention.

FIG. 6 is a schematic view to show an operating part 35 that enables generation of an RF signal having a good S/N. The operating part 35 is provided in an electric signal processing part 83 inside information record and playback equipment. Though the RF signal also can be obtained by using any one of signals RFP or RFN, extraneous noise that will enter the path leading from the optical pick-up head unit to the electric signal processing part 83 can be reduced by a differentiation-operation at the operating part 35.

Unlike the preceding embodiment, this embodiment refers to a structure including only two signal lines for generating an RF signal, so noise enters with difficulty. In other words, the structure is suitable for information record and playback equipment that requires a higher S/N. All of the I-V converting parts 511C–516C are inversion type (i.e., inversion type converters and non-inversion type converters are not mixed), so differences among the relative delay time of the signals outputted from the I-V converting parts 511C–516C are small. The delay time differences among the I-V converting parts are about several ns if the converters include both inversion type and non-inversion type, while the delay time difference does not occur if there are only one kind of converters. Therefore, the RF signal is less distorted even at a high-speed reproduction, so the converting parts are suitably used for information record and playback equipment to reproduce information at a high speed. Though the I-V converting parts 511C–516C of this embodiment are inversion type, non-inversion type converting parts are expected to provide similar effects.

Figure 7:
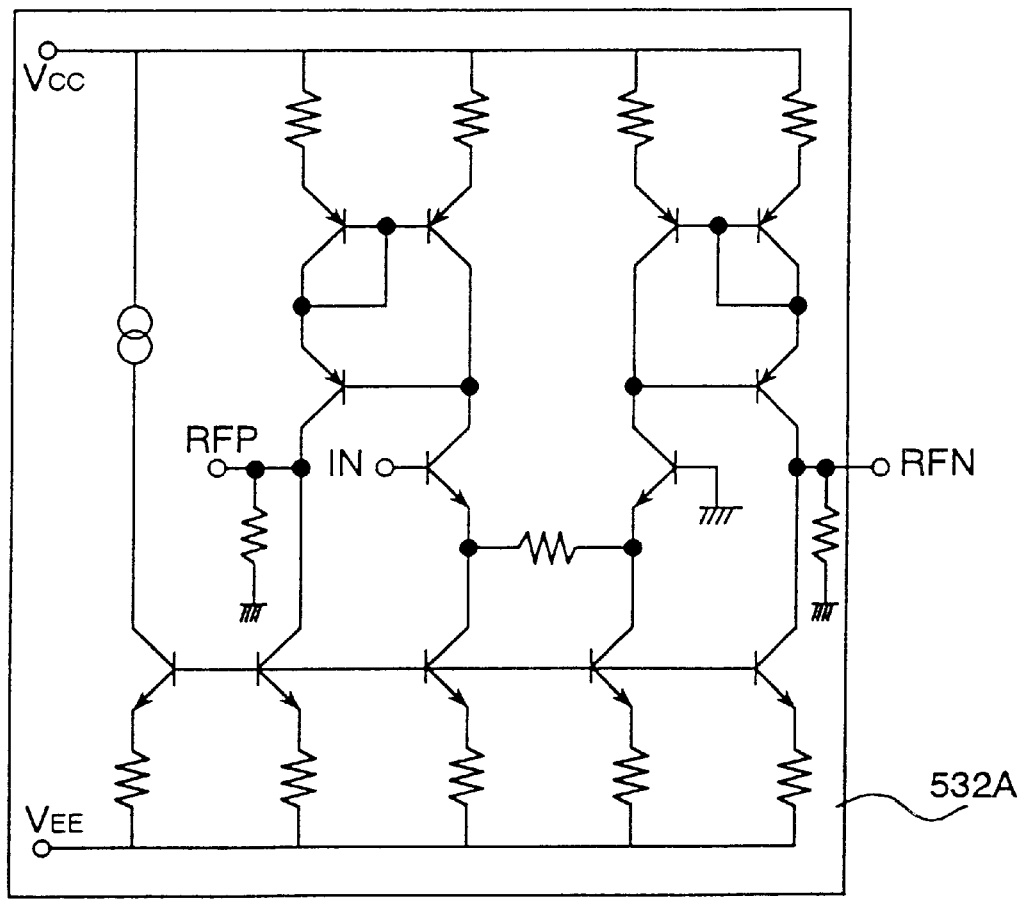
FIG. 7 is a schematic view to show the structure of a differential signal generating part in one embodiment of the present invention.

FIG. 7 shows the structure of a differential signal generating part 532. The differential signal generating part 532A is configured to be a differential amplifier. A signal outputted from an addition-operating part is inputted in the portion 'IN'. Since the signals RFP and RFN are generated at the same differential amplifier, the relative delay time between the signals RFP and RFN can be reduced. In this embodiment, the differential delay is about 1 ns.

Figure 8:
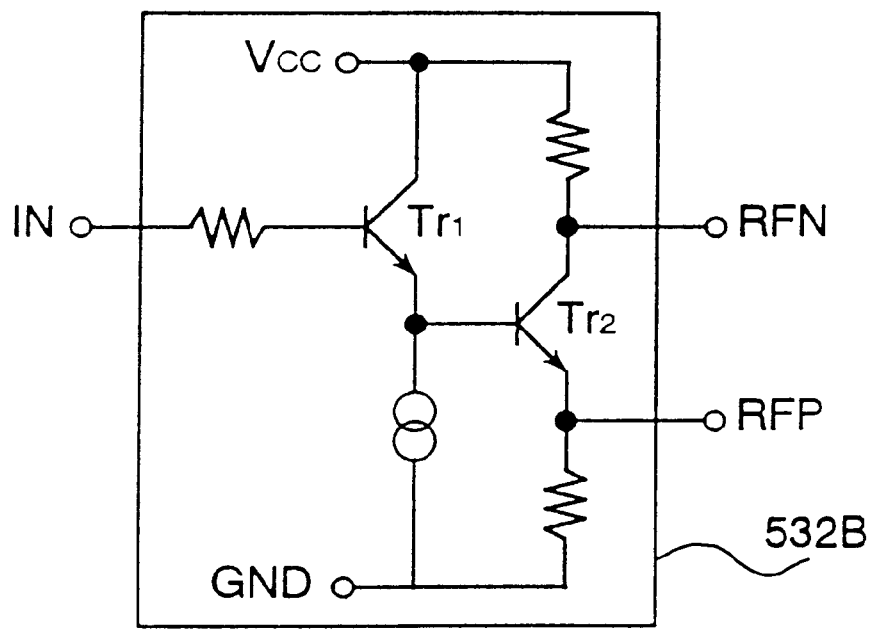
FIG. 8 is a schematic view to show the structure of a differential signal generating part in another embodiment of the present invention.

FIG. 8 is a schematic view to show another embodiment for the differential signal generating part 532. The differential signal generating part 532B generates signals RFP and RFN by assembling NPN bipolar transistors that are semiconductor elements having identical properties. Signals outputted from the addition-operating part enter the base of the transistors, and the signal RFP is outputted from the emitter, the signal RFN from the collector. As the signals RFP and RFN are generated by using the semiconductor elements having identical properties, the relative delay time difference between the signals RFP and RFN can be reduced to about 0.5 ns. This level is lower compared to the case of the differential signal generating part 532A. Therefore, this embodiment can be suitably used for information record and playback equipment to reproduce information at a higher speed.

Moreover, a flat gain property can be provided up to higher frequencies without using any micro-processes because the element numbers are decreased. Therefore, photodetectors can be produced at a low cost by using substantially outmoded productive facilities that have already depreciated. When an up-to-date micro-process is used, obviously, a photodetector that is further suitable for a high-speed reproduction can be produced.

In addition, the differential signal generating part 532B is suitable for use in reproducing information on a medium with a low reflectivity, since the internal noise generated in the circuit is low when compared to the differential signal generating part 532A. Moreover, the signal distortion rate is lower by about 10 dB than that of the differential signal generating part 532A, so the differential signal generating part 532B can reproduce information with an improved accuracy.

NPN bipolar transistors are used in this embodiment, but other semiconductor elements such as PNP type bipolar transistors and field effect transistors also can be used with no problems. When field effect transistors are used, a gate corresponds to a base, a drain corresponds to a collector, and a source corresponds to an emitter.

Figure 9:
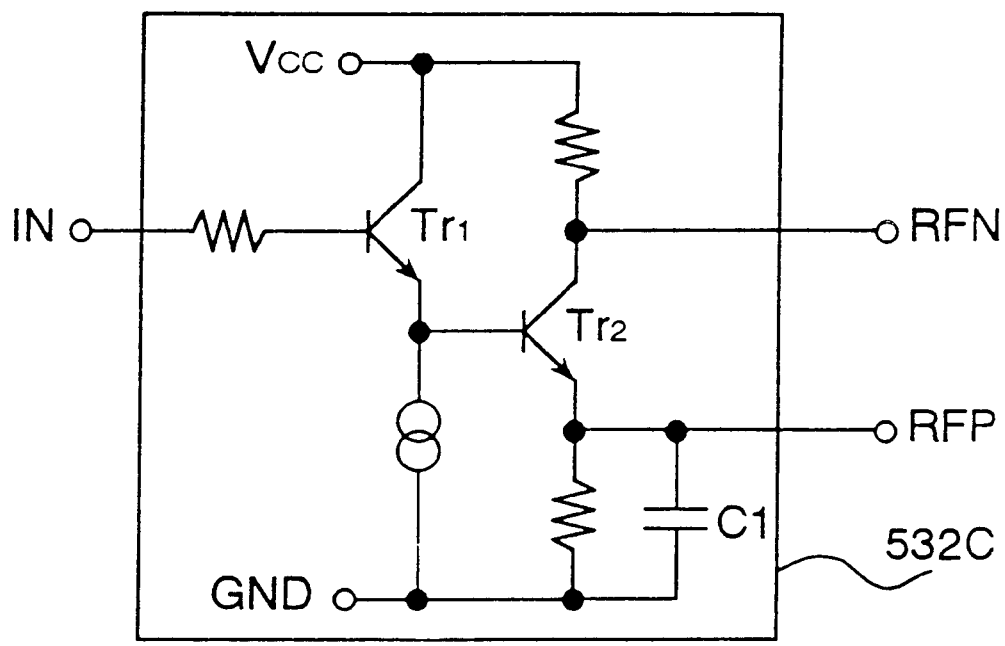
FIG. 9 is a schematic view to show the structure of a differential signals generating part in a third embodiment of the present invention.

FIG. 9 is a schematic view to show a third embodiment of a differential signal generating part 532. The differential signal generating part 532C has substantially the same structure as the differential signal generating part 532B. The differential signal generating part 532C is distinguished in that a capacitor C1 is provided with the resistor to be connected to the emitter. By selecting a proper value for C1, the relative difference $\Delta\tau$ between the delay time $\tau_p$ of the signal RFP and the delay time $\tau_n$ of the signal RFN $(=\tau_p-\tau_n)$ can be reduced to 0. C1 functions as a delay time correcting part to decrease the delay time difference between the signals RFP and RFN.

Figure 10:
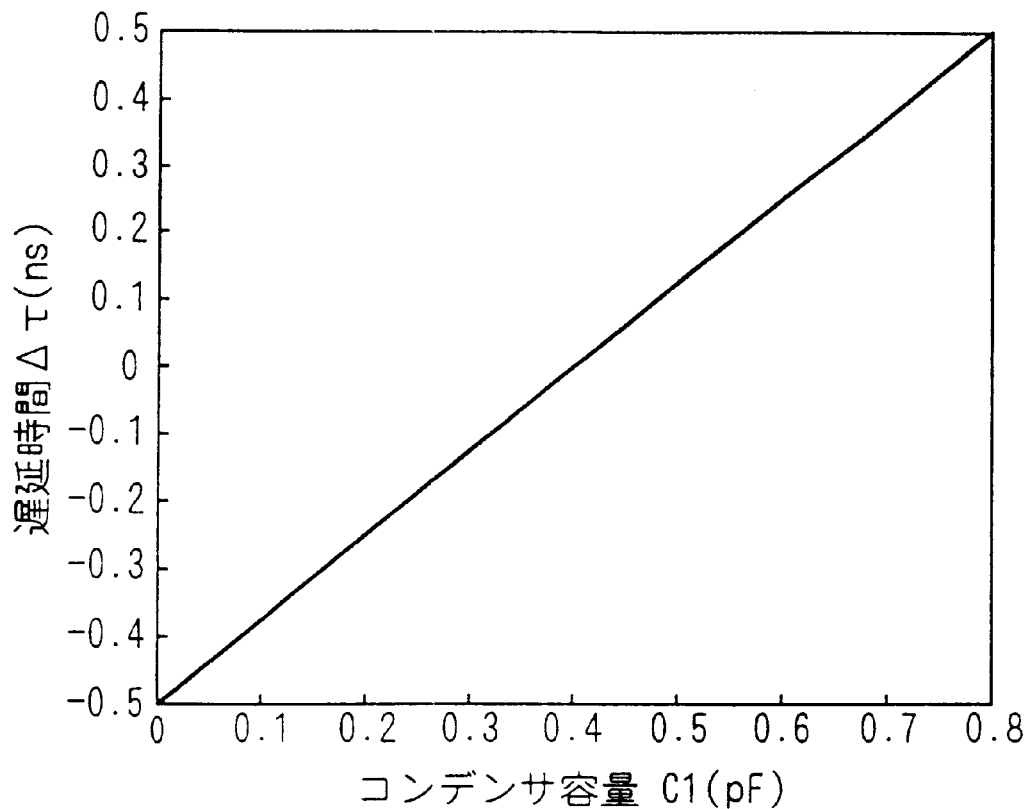
FIG. 10 is a graph to show the relationship between capacitance of a capacitor and delay time.

FIG. 10 is a graph to show the relationship between the capacitance of the capacitor C1 at the differential signal generating part 532 and delay time difference $\Delta\tau$. In FIG. 10, the delay time difference is −0.5 ns when the capacitance of the capacitor C1 is 0. The delay time difference $\Delta\tau$ can be controlled by changing the value of the capacitor C1. When the capacitance of the capacitor C1 is 0.4 pF, the delay time difference $\Delta\tau$ becomes 0. The differential signal generating part 532C provided with a delay time correcting part can reduce the relative delay time difference between signals RFP and RFN, compared to the differential signal generating part 532B. As a result, information record and playback equipment that reproduces information at an even higher speed can be provided.

Figure 11:
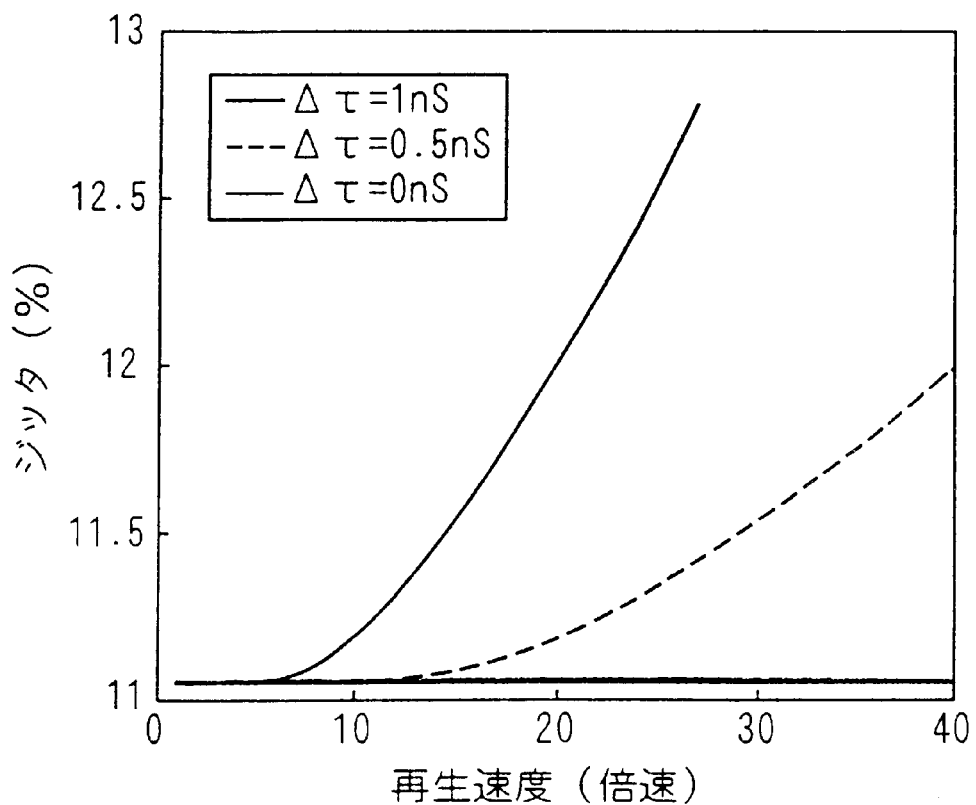
FIG. 11 is a graph to show the relationship between reproduction speed and jitter.

FIG. 11 is a graph to show the relationship between a reproduction speed and jitter when information recorded on a DVD format disk is reproduced. This reproduction speed is a single speed when the rotation speed for a disk described in a reference book is 3.49 m/s (linear speed). The jitter value means a jitter among data, which is standardized by using a window width.

In FIG. 11, the jitter does not deteriorate at all even if the reproduction speed is increased, when the delay time difference $\Delta\tau$ is 0. However, when the difference $\Delta\tau$ is 0.5 ns, the jitter begins to increase at the point where the speed becomes about 10×; when the difference is 1.0 ns, the jitter begins to increase at the point where the speed becomes about 5×.

For information record and playback equipment including the differential signal generating part 532 in accordance with this embodiment, the jitter does not increase even at a high-speed reproduction since the delay time difference $\Delta\tau$ is determined to be 0, and thus, information recorded on an optical recording medium can be reproduced accurately.

Figure 12:
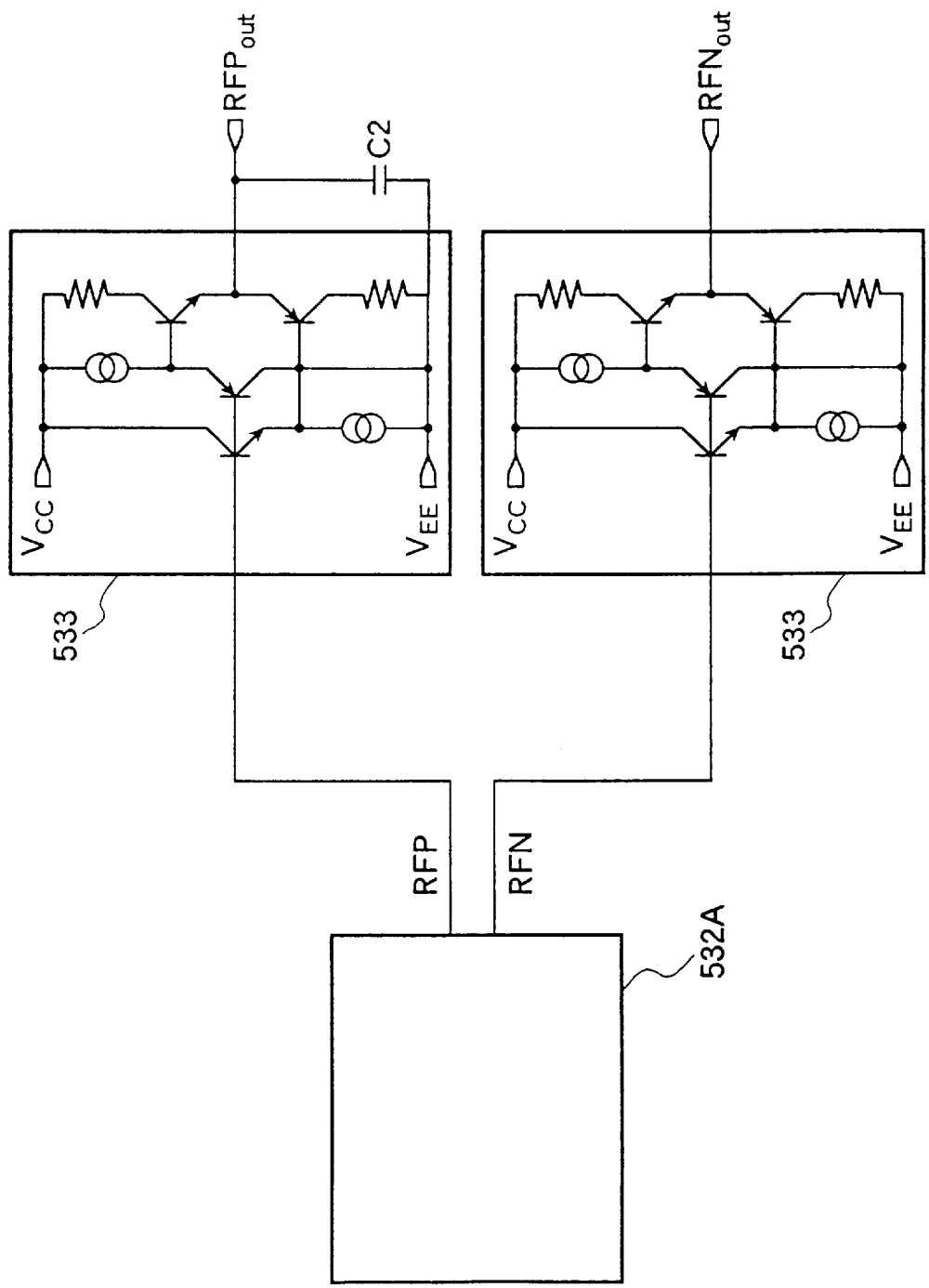
FIG. 12 is a schematic view to show a structure of a differential signal generating part in another embodiment of the present invention.

FIG. 12 is a schematic view to show another embodiment for the differential signal generating part 532. In this embodiment, signals RFP and RFN outputted from a differential signal generating part 532A enter respectively a buffer amplifier 533 in order to reduce influences to which the signals RFP and RFN are subjected by a load connected with the output of the differential signal generating part 532A. Signals entering the buffer amplifier 533 are outputted respectively as $RFP_{out}$ and $RFN_{out}$. In FIG. 12, the delay time difference $\Delta\tau$ is corrected by providing a capacitor C2 to the $RFP_{out}$.

Figure 13:
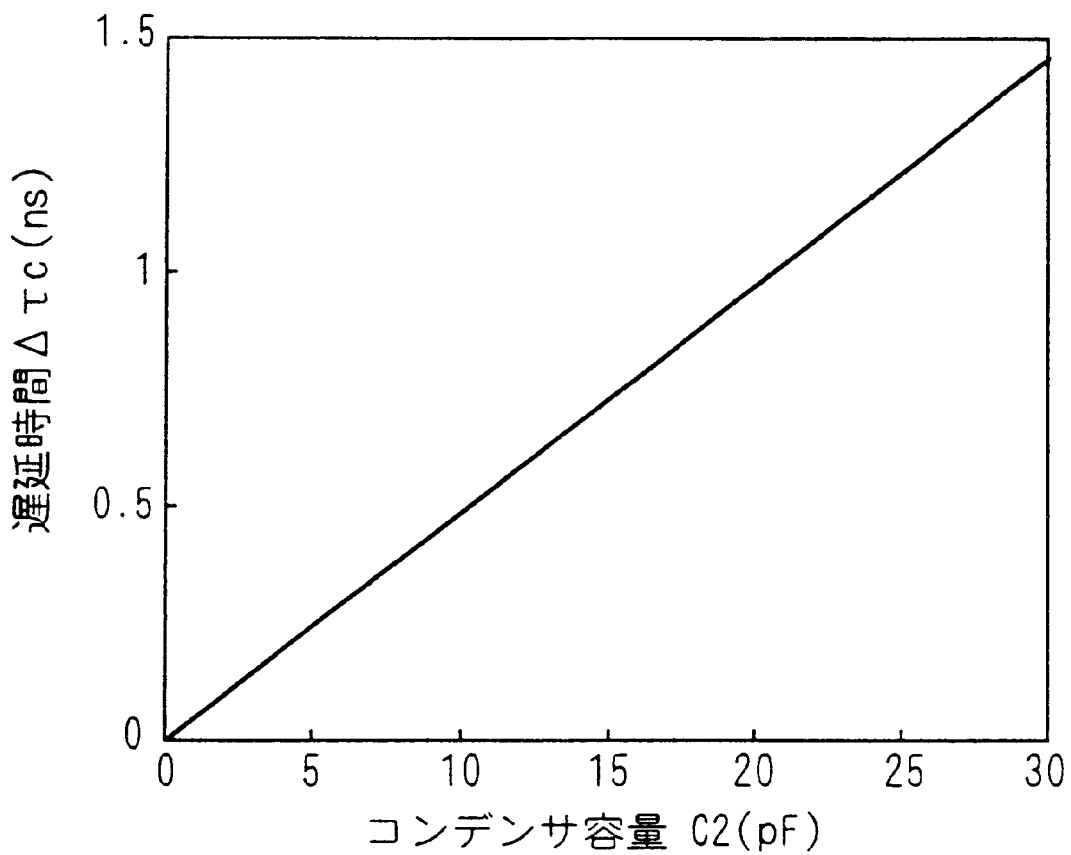
FIG. 13 is a graph to show the relationship between capacitance of a capacitor and delay time.

FIG. 13 is a graph to show the relationship between capacitance of the capacitor C2 and the delay time $\Delta\tau_c$ of signals outputted from the buffer amplifier. When the capacitance of the capacitor C2 is 0, the delay time $\Delta\tau_c$ is also 0. The delay time $\Delta\tau_c$ can be controlled by changing the value of the capacitor C2.

In this circuit, the delay time $\Delta\tau_c$ changes by 0.5 ns when the capacitance of the capacitor C2 is determined to be 10 pF. If the delay time difference $\Delta\tau$ between signals outputted from RFP and RFN at the differential signal generating part 532A is −1 ns, the delay time difference between the signals outputted from $RFP_{out}$ and $RFN_{out}$ can be reduced to be 0 by determining the capacitance of the capacitor C2 to be 20 pF.

As a result, the delay time difference $\Delta\tau$ can be reduced to be 0 for information record and playback equipment using a differential signal generating part in accordance with this embodiment. Therefore, jitter does not increase even during high-speed reproduction, and information recorded on an optical recording medium can be reproduced accurately.

A simplest delay time correcting part is exemplified in this embodiment, but other various delay-correcting means such as a delay line can be used. Though only minimum elements composing a photodetector are shown in this embodiment, further functions also can be included. For example, a buffer amplifier can be included to reduce influences of capacitance of a load connected with an output terminal; and one or more correcting parts can be provided to reduce DC offset.

Figure 14:
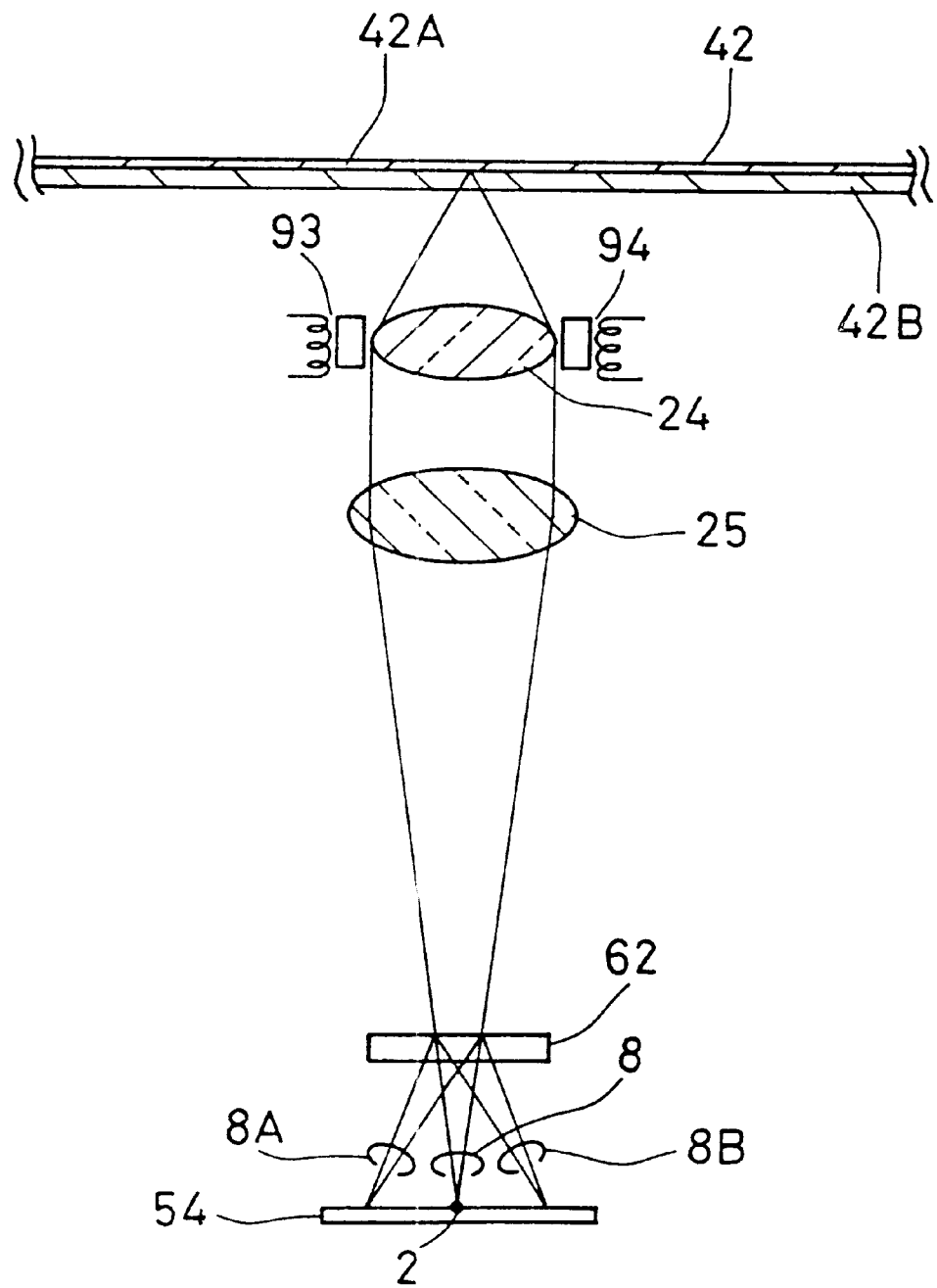
FIG. 14 is a schematic view to show the structure of an optical pick-up head unit in another embodiment of the present invention.

FIG. 14 is a schematic view to show an optical pick-up head unit for a DVD. In FIG. 14, 2 denotes a light source, 8 denotes a divergent beam, 24 denotes an object lens, 25 denotes a collimator lens, 42 denotes an optical recording medium, 54 denotes a photodetector, 62 denotes a holographic element, and 93 and 94 denote actuators.

The light source 2 radiates a divergent beam 650 nm in wavelength. A beam 8 radiated from the light source 2 enters the holographic element 62, and in the optical path from the light source 2 to the medium 42, the zero-order diffracted light of the holographic element 62 enters the collimator lens 25.

The beam 8 entering the collimator lens is converted into parallel light and focused on the optical recording medium 42 by the object lens 24. Numerical aperture of the object lens 24 is 0.6. On an information recording surface 42A of the optical recording medium 42, a series of pits whose track pitch is 0.74 µm and whose shortest marking length is 0.4 µm are recorded as information. The substrate 42B is 0.6 mm in thickness.

The beam 8, which is reflected and diffracted on the optical recording medium 42, re-transmits through the object lens 24 and the collimator lens 25, and subsequently enters the holographic element 62. The beam 8 entering the holographic element 62 becomes a plurality of diffracted light beams, and ±first-order diffracted light beams 8A and 8B are received at the photodetector 54 and converted into electric signals.

Figure 15:
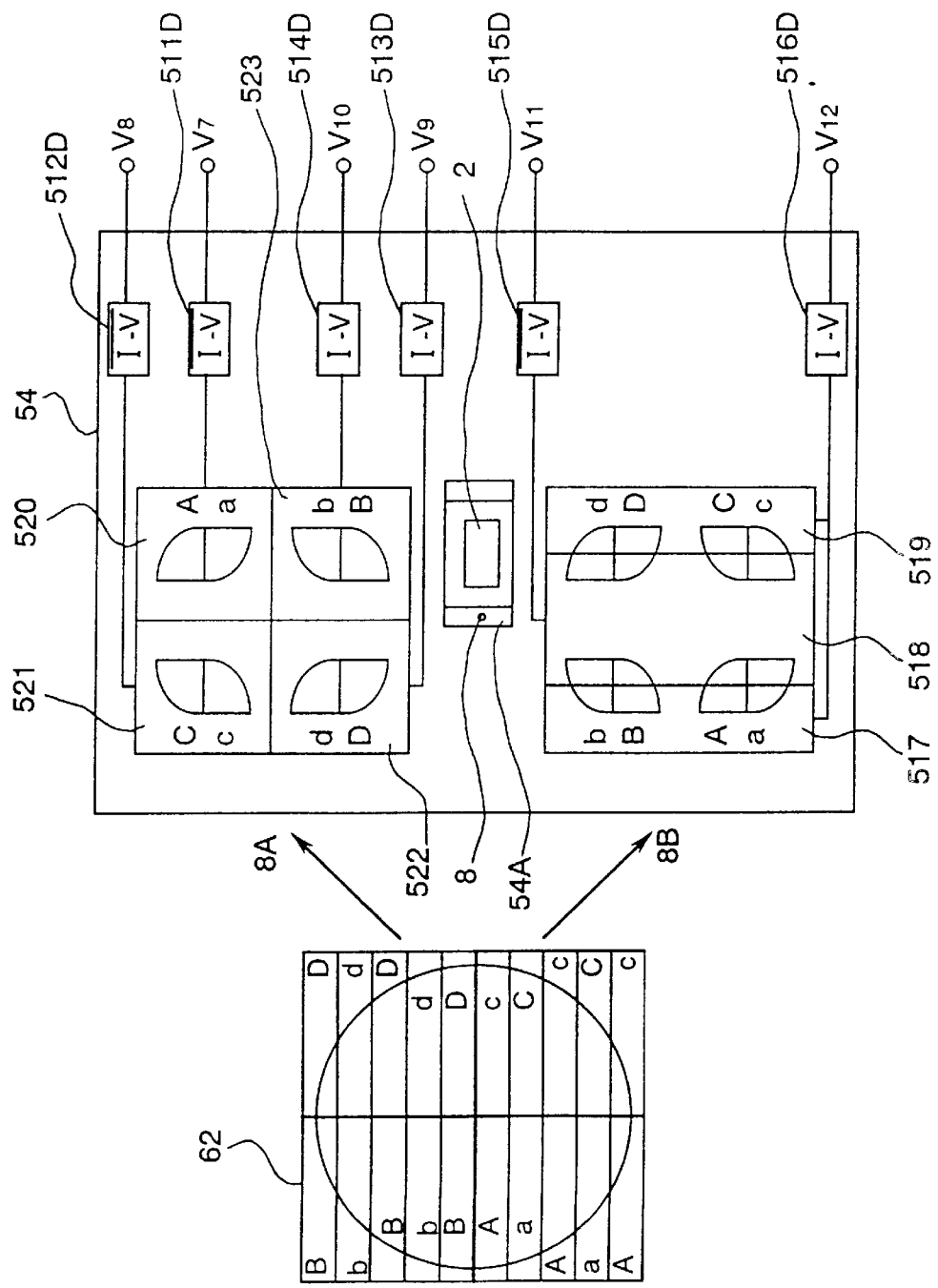
FIG. 15 is a schematic view to show the structure of a photodetector in a third embodiment of the present invention.

FIG. 15 is a schematic view to show the relationship between the holographic element 62 and the photodetector 54. The holographic element 62 includes regions A-D and a-d, and the respective regions generate diffracted light. The photodetector 54 includes receiving parts 517–523 and I-V converting parts 511D–516D. The I-V converting parts 511D, 512D and 515D are non-inversion type while the remaining are inversion type.

The light source 2 is positioned on the photodetector 54 that is made by etching a silicon substrate. A beam 7 radiated from the light source 2 is reflected at a mirror 54A formed on the silicon substrate. The optical path of the beam 7 becomes perpendicular to the face of the photodetector 54 on which the receiving parts 517–523 are formed. The sector patterns on the receiving parts 517–523 are beams generated from the regions of the holographic element 62. The FE signal is detected by a spot-size detection method, while the TE signal is detected by a phase contrast detection method. Further explanation about these well-known methods will be omitted in this specification.

Electric signals are outputted from the photodetector 54. More specifically, the TE signal is generated by using signals V7–V10, the FE signal is generated by using V11 and V12, and the RF signal is generated by using V7–V12. The RF signal is generated by differentiation operation while the FE signal is generated by an addition-operation. Since the FE signal can be in a band 1/100 of the RF signal, extraneous noise will not cause serious problems. The FE signal and RF signal are supplied to actuators 93 and 94 for control of focusing and tracking.

Figure 16:
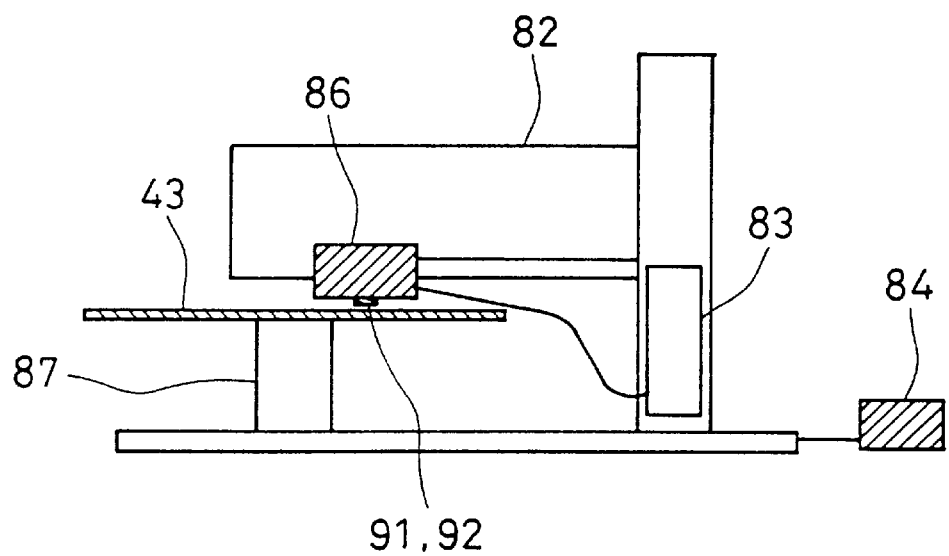
FIG. 16 is a schematic view to show the structure of information record and playback equipment of the present invention.
Figure 17:
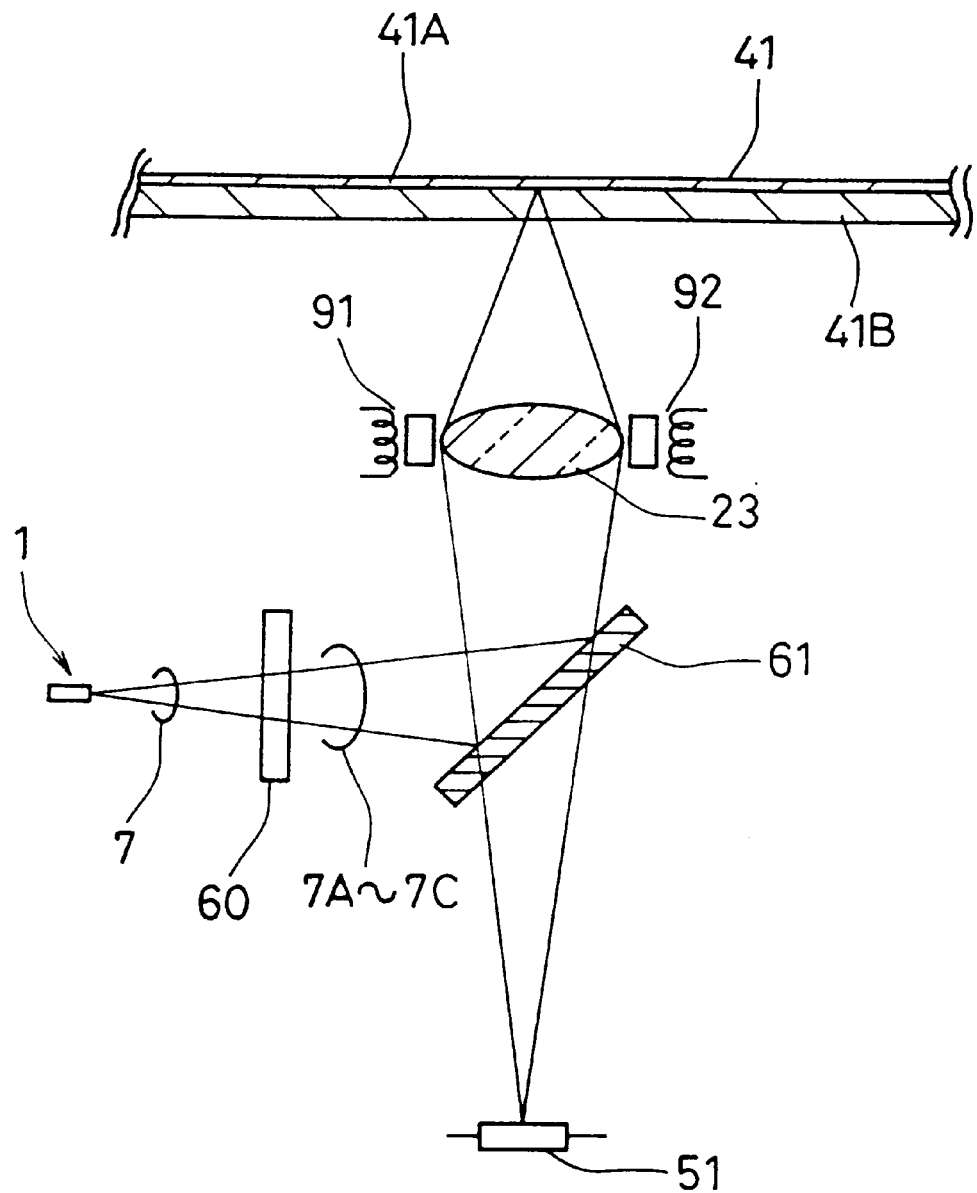
FIG. 17 is a schematic view to show the structure of a conventional optical pick-up head unit.
Figure 18:
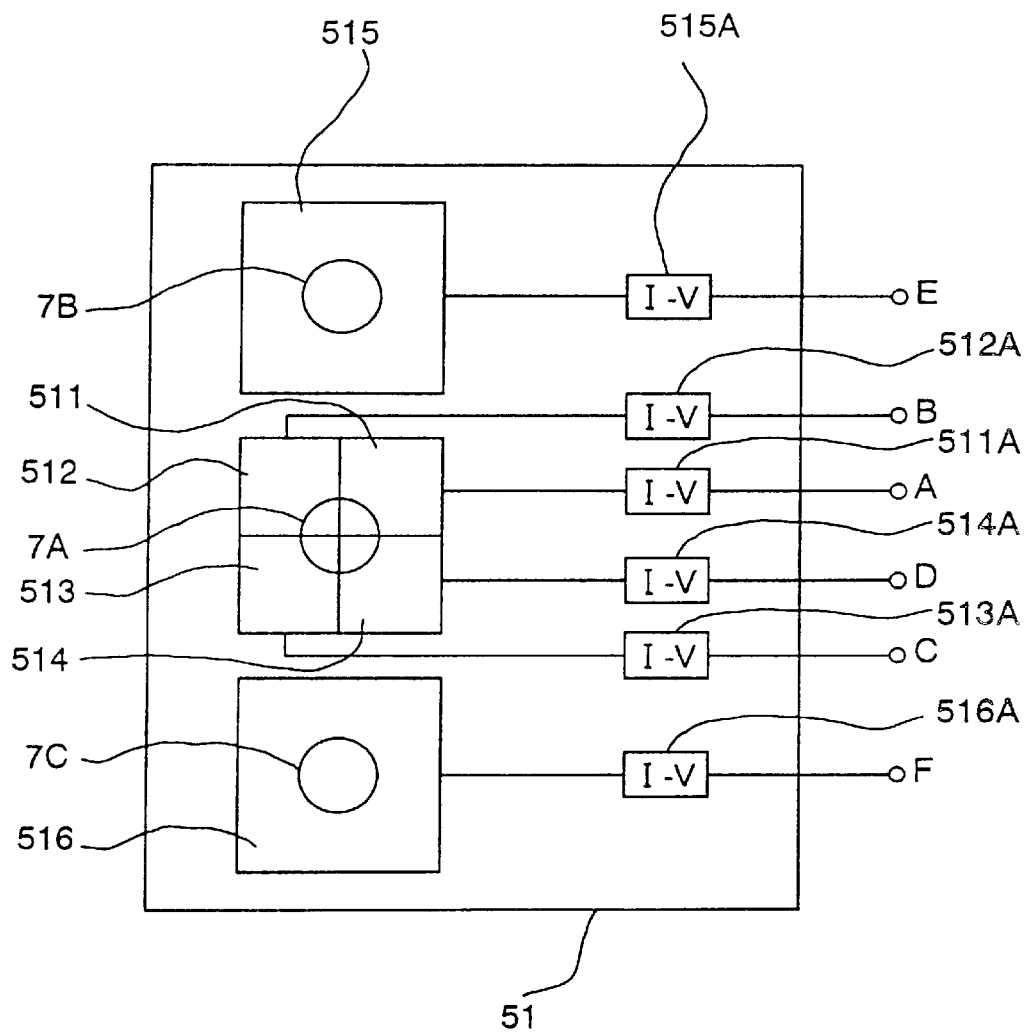
FIG. 18 is a schematic view to show the structure of a photodetector of a conventional optical pick-up head unit.

FIG. 16 is a schematic view to show information record and playback equipment including the optical pick-up head unit described above. An optical recording medium 43 is rotated by an actuating part 87. The optical pick-up head unit 86 sends signals to an electric signal processing part 83. The signals include signals corresponding to a position related to the optical recording medium 43 and also signals for reproducing information recorded on the medium. The electric signal processing part 83 amplifies or operates the signals and outputs signals to slightly move either the optical pick-up head unit or an object lens inside the unit. The electric signal processing part 83 also reproduces information recorded on the optical recording medium 43. Numeral 82 denotes an actuating part of the optical pick-up head unit. An actuating part for the object lens inside the optical pick-up head unit 86 is the actuator 94 in FIG. 14. Focus servo and tracking servo are carried out for the optical recording medium 43 by the signals outputted from the electric signal processing part 83 and also by the actuating part 82 or 94 in order to read, write or erase information. Numeral 84 denotes a power source or a part connected with an external power source. This part supplies electricity to the electric signal processing part 83, the actuating part 82 of the optical pick-up head unit, and the actuating part 87 for the optical recording medium 43. Power sources or terminals for connecting with external power sources can be provided for the respective actuating circuits.

The medium is not limited to a reflection type as mentioned in this embodiment, but transmission type also can be used. Optical recording media are not limited CDs or DVDs, but other media such as optical magnetic disks can be also used.

The present invention will not be limited in the method for detecting FE and TE signals, but any other methods such as a Foucault method or a double-knife-edge method for detecting an FE signal, or a wobbling method for detecting a TE signal also can be used. For the optical pick-up head unit, various structures can be used by using a polarized beam splitter or other optical elements, without departing from the subject-matter of the present invention.

As mentioned above, an RF signal can be obtained by a differentiation operation at an electric signal processing part, and thus, the signal is less influenced by extraneous noise, and information recorded on a medium can be read with high reliability.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical pick-up head unit comprising:

a light source to radiate a beam;

a focusing optical system that receives the beam radiated from the light source and converges the beam at a microspot on an optical recording medium; and a photodetector that receives the beam irradiated on the optical recording medium and outputs an electric signal corresponding to the quantity of the received light, wherein the photodetector comprises a plurality of receiving parts for outputting signals used to generate focus error signals and also a plurality of I-V converting parts respectively to receive current signals outputted from the receiving parts and to convert the current signals into voltage signals, wherein first I-V converting parts output signals that change in the positive direction when light enters the receiving parts; second I-V converting parts output signals that change in the negative direction when light enters the receiving parts, and substantially half of the receiving parts are connected with the first I-V converting parts while the remaining are connected with the second I-V converting parts.

2. The optical pick-up head unit according to claim 1, wherein the receiving parts output signals used to generate tracking error signals.

3. The optical pick-up head unit according to claim 1, comprising not only the receiving parts to output signals used to generate the focus error signals but also a plurality of receiving parts to output signals used to generate tracking error signals.

4. Information record and playback equipment comprising:

an actuating part that changes a relative position between an optical recording medium and an optical pick-up head unit, and an electric signal processing part that receives signals outputted from the optical pick-up head unit and operates the signals to obtain desired information, wherein an optical pick-up head unit according to claim 1 is used.

5. The information record and playback equipment according to claim 4, wherein the electric signal processing part comprises a differential operating part to generate a signal for reproducing information recorded on the optical recording medium by receiving a signal outputted from the optical pick-up head unit and carrying out a differentiation operation.

6. An optical pick-up head unit comprising:

a light source to radiate a beam;

a focusing optical system that receives the beam radiated from the light source and converge the beam at a microspot on an optical recording medium; and a photodetector that receives the beam irradiated on the optical recording medium and outputs an electric signal corresponding to the quantity of the received light, wherein the photodetector comprises receiving parts for outputting signals used to generate a focus error signal, I-V converting parts to receive current signals outputted from the receiving parts and to convert the current signals into voltage signals, and a signal generating part, wherein the signal generating part generates first signals that change in the positive direction and second signals that changes in the negative direction when light enters the receiving part, and the ratio of the first signals to the second signals is substantially 1:1.

7. The optical pick-up head unit according to claim 6, wherein the receiving parts output signals used to generate a tracking error signal.

8. The optical pick-up head unit according to claim 6, comprising not only the receiving parts outputting signals used to generate the focus error signal but receiving parts outputting signals used to generate a tracking error signal.

9. An optical pick-up head unit comprising:

a light source to radiate a beam;

a focusing optical system that receives the beam radiated from the light source and converges the beam at a microspot on an optical recording medium; and a photodetector that receives the beam irradiated on the optical recording medium and outputs an electric signal corresponding to the quantity of the received light, wherein the photodetector comprises receiving parts, I-V converting parts that receive current signals outputted from the receiving parts and convert the current signals into voltage signals, and a signal generating part that generates a first signal to change in the positive direction and a second signal to change in the negative direction when light enters the receiving part, and a delay correcting part to correct relative delay time between the first signal and the second signal.

10. The optical pick-up head unit according to claim 9, wherein the signal generating part generates the first signal and the second signal by using an identical semiconductor element.

* * * * *

UNITED STATES PATENT AND TRADEMARK OFFICE
CERTIFICATE OF CORRECTION

PATENT NO. : 6,154,426
DATED : November 28, 2000
INVENTOR(S) : Kadowaki

It is certified that error appears in the above-identified patent and that said Letters Patent is hereby corrected as shown below:

Drawings,
Sheet 10 of 18: Error in writing on Figure 10. Writing should be changed from Japanese to English as shown below:

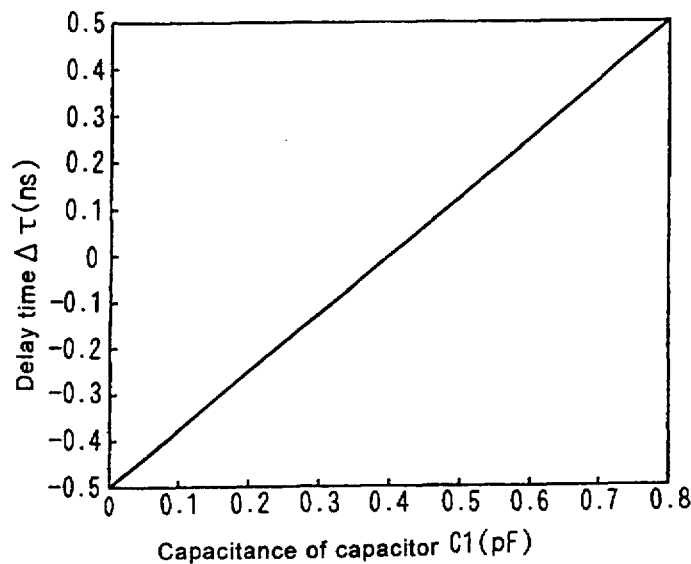

FIG.10

UNITED STATES PATENT AND TRADEMARK OFFICE
CERTIFICATE OF CORRECTION

PATENT NO.   : 6,154,426                                Page 2 of 3
DATED        : November 28, 2000
INVENTOR(S)  : Kadowaki It is certified that error appears in the above-identified patent and that said Letters Patent is hereby corrected as shown below:

Sheet 11 of 18: Error in writing on Figure 11. Writing should be changed from Japanese to English as shown below:

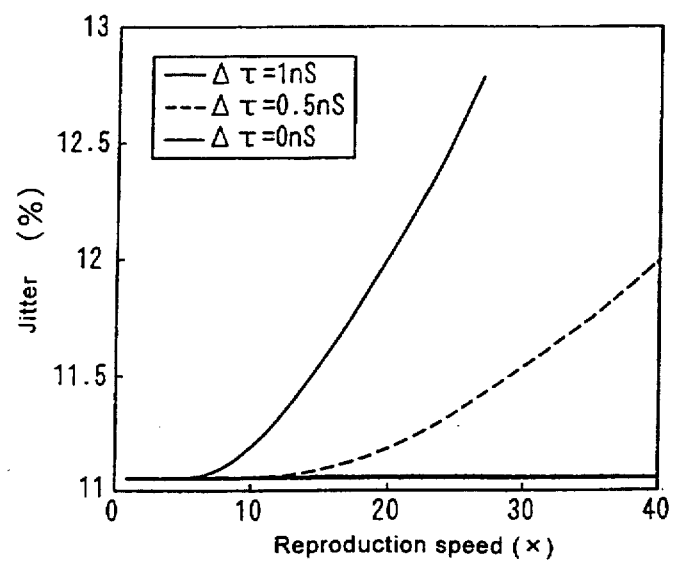

FIG.11

UNITED STATES PATENT AND TRADEMARK OFFICE
CERTIFICATE OF CORRECTION

PATENT NO.   : 6,154,426                                           Page 3 of 3
DATED        : November 28, 2000
INVENTOR(S)  : Kadowaki It is certified that error appears in the above-identified patent and that said Letters Patent is hereby corrected as shown below:

Sheet 13 of 18: Error in writing on Figure 13. Writing should be changed from Japanese to English as shown below:

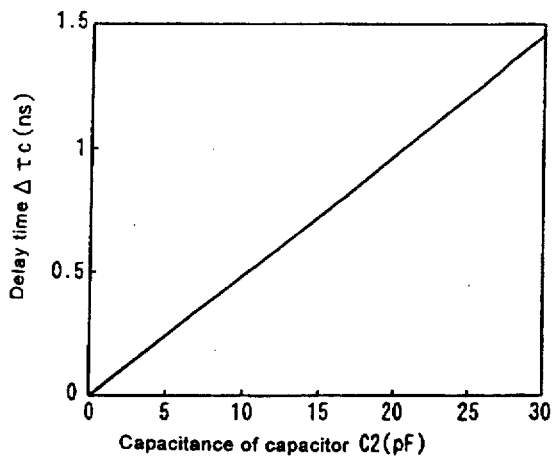

FIG.13

Signed and Sealed this

Twenty-fifth Day of December, 2001

Attest:

JAMES E. ROGAN
Attesting Officer    Director of the United States Patent and Trademark Office